(12) United States Patent
Sasaki et al.

(10) Patent No.: US 7,249,408 B2
(45) Date of Patent: Jul. 31, 2007

(54) METHOD OF MANUFACTURING A THIN-FILM MAGNETIC HEAD

(75) Inventors: Yoshitaka Sasaki, Santa Clara, CA (US); Takehiro Kamigama, Hong Kong (CN); Hironori Araki, Milpitas, CA (US)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 239 days.

(21) Appl. No.: 10/807,280

(22) Filed: Mar. 24, 2004

(65) Prior Publication Data

US 2005/0210659 A1   Sep. 29, 2005

(51) Int. Cl.
  *G11B 5/187*   (2006.01)
  *B44C 1/22*    (2006.01)

(52) U.S. Cl. .............. 29/603.15; 29/603.11; 29/603.14; 29/603.18; 216/22; 216/66

(58) Field of Classification Search ............ 29/603.11, 29/603.13, 603.14, 603.15, 603.16, 603.18, 29/DIG. 16, 603.07; 360/122, 125, 126; 216/22, 41, 66
See application file for complete search history.

(56) References Cited

U.S. PATENT DOCUMENTS 5,640,753 A * 6/1997 Schultz et al. ....... 29/603.15 X
6,278,580 B1 * 8/2001 Sasaki ................... 360/126
6,524,491 B1 * 2/2003 Liu et al. ................ 216/22
6,683,749 B2 * 1/2004 Daby et al. .......... 29/603.15 X
2001/0055879 A1   12/2001 Sasaki

FOREIGN PATENT DOCUMENTS

| JP | A-07-110917  | 4/1995    |
| JP | A-11-273027  | 10/1999   |
| JP | A-2003-288705| 10/2003   |
| JP | 2005-276425  | * 10/2005 |

* cited by examiner

*Primary Examiner*—A. Dexter Tugbang
(74) *Attorney, Agent, or Firm*—Oliff & Berridge, PLC

(57) ABSTRACT

The method of manufacturing a thin-film magnetic head in accordance with the present invention comprises the steps of forming a first magnetic pole layer; removing both sides in a track width direction of the first magnetic pole layer so as to leave a predetermined residual area in the first magnetic pole layer; forming an insulating layer about the residual area of the first magnetic pole layer; forming a gap layer made of a nonmagnetic material; forming a second magnetic pole layer magnetically connected to the first magnetic pole; and patterning the second magnetic pole layer by etching while using a mask.

4 Claims, 18 Drawing Sheets

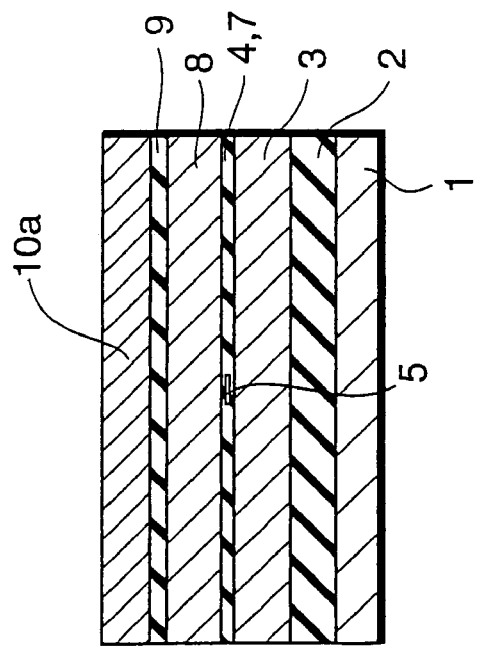
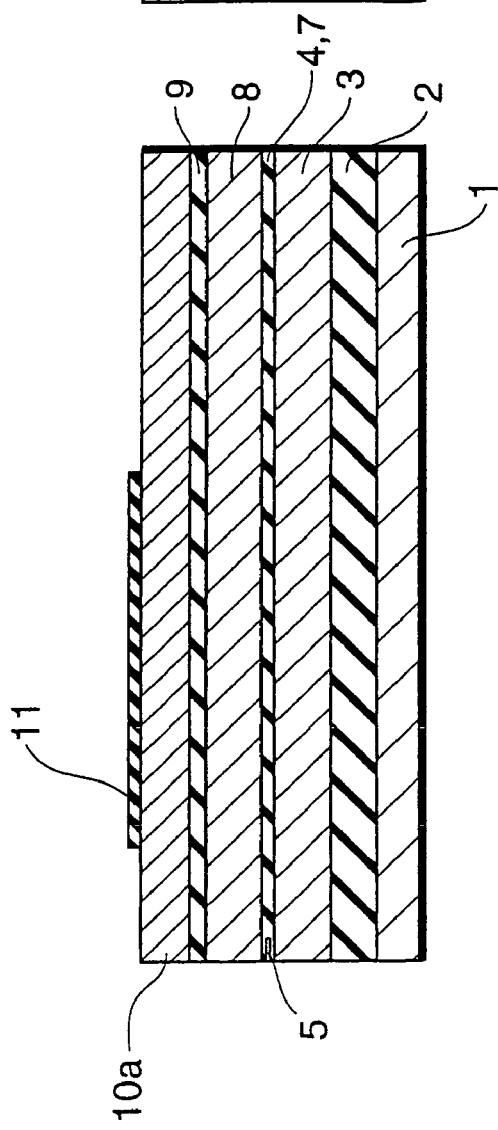

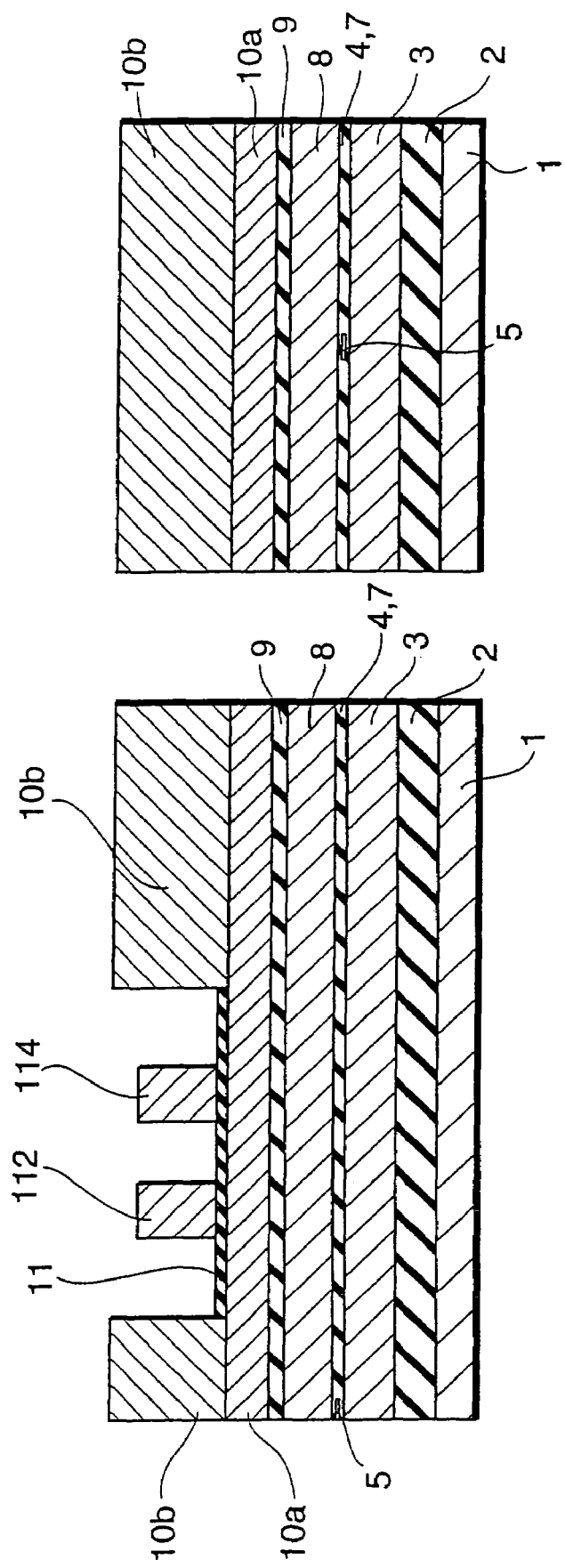

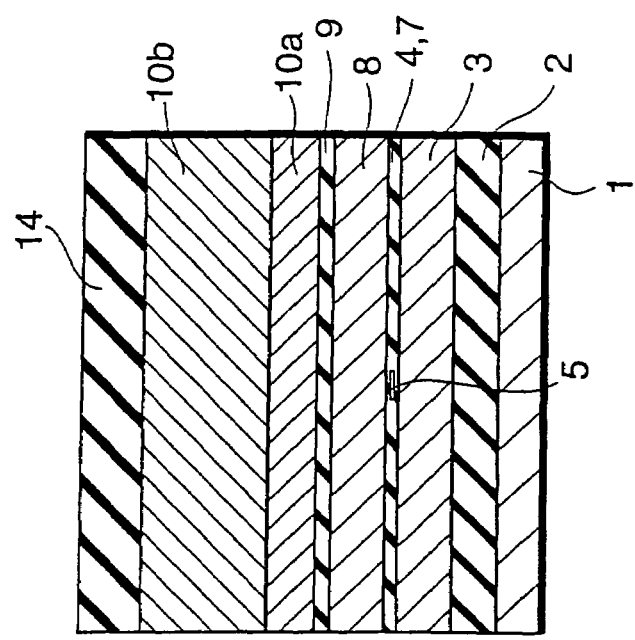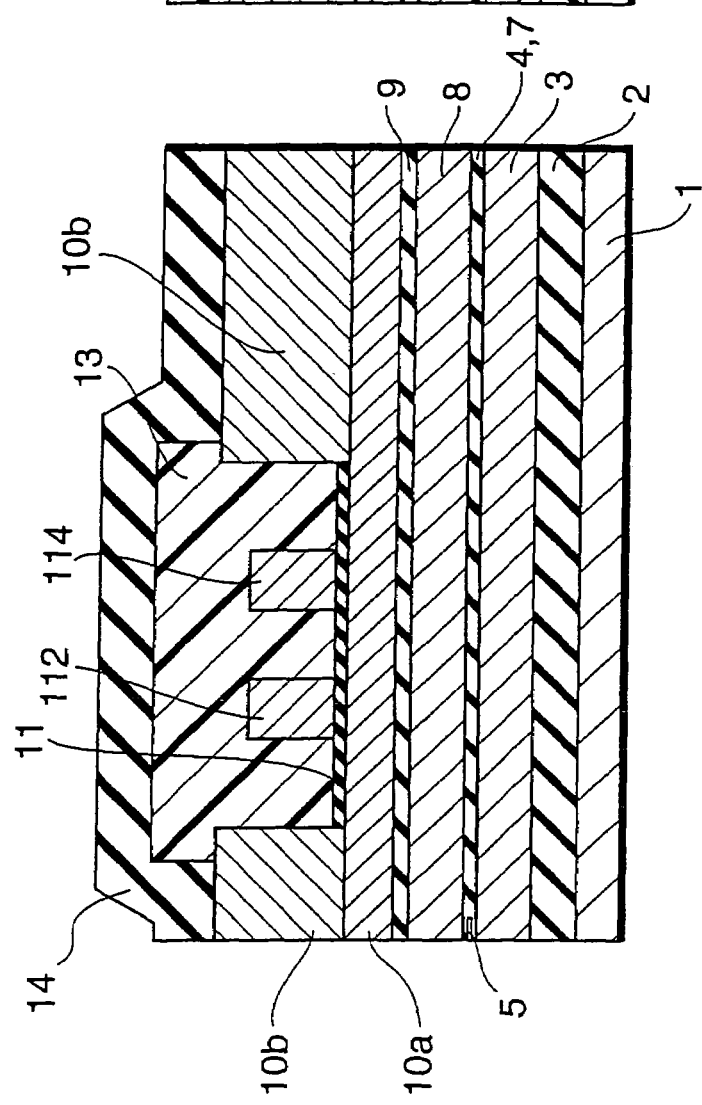

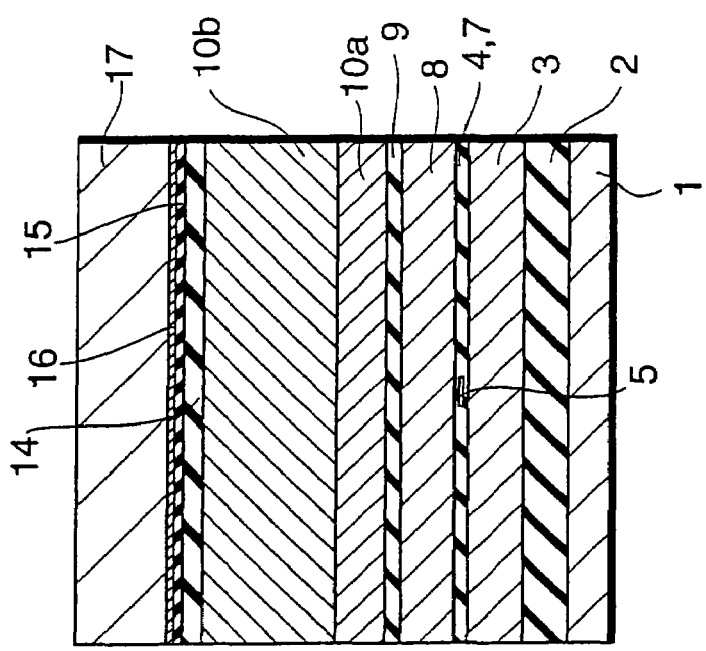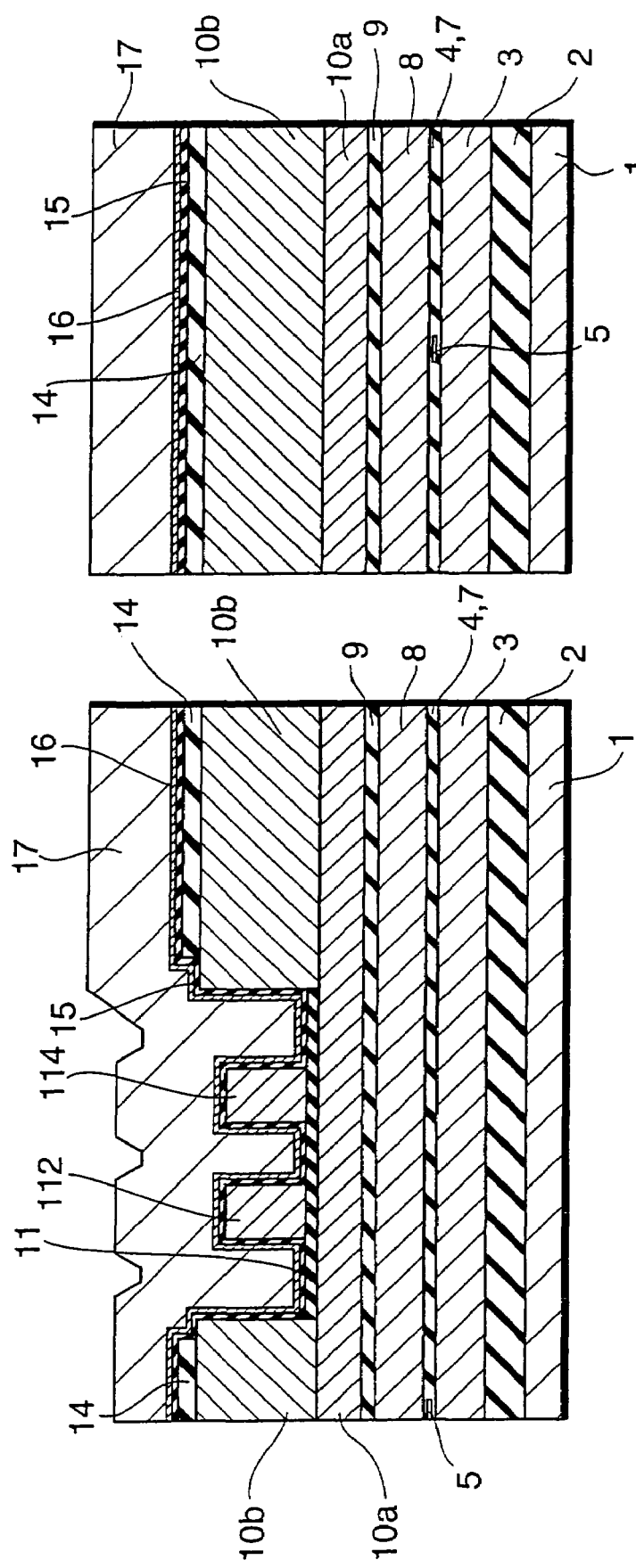

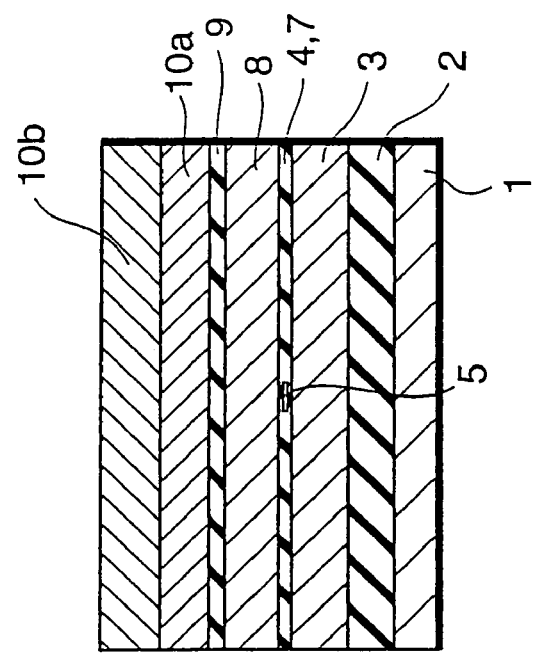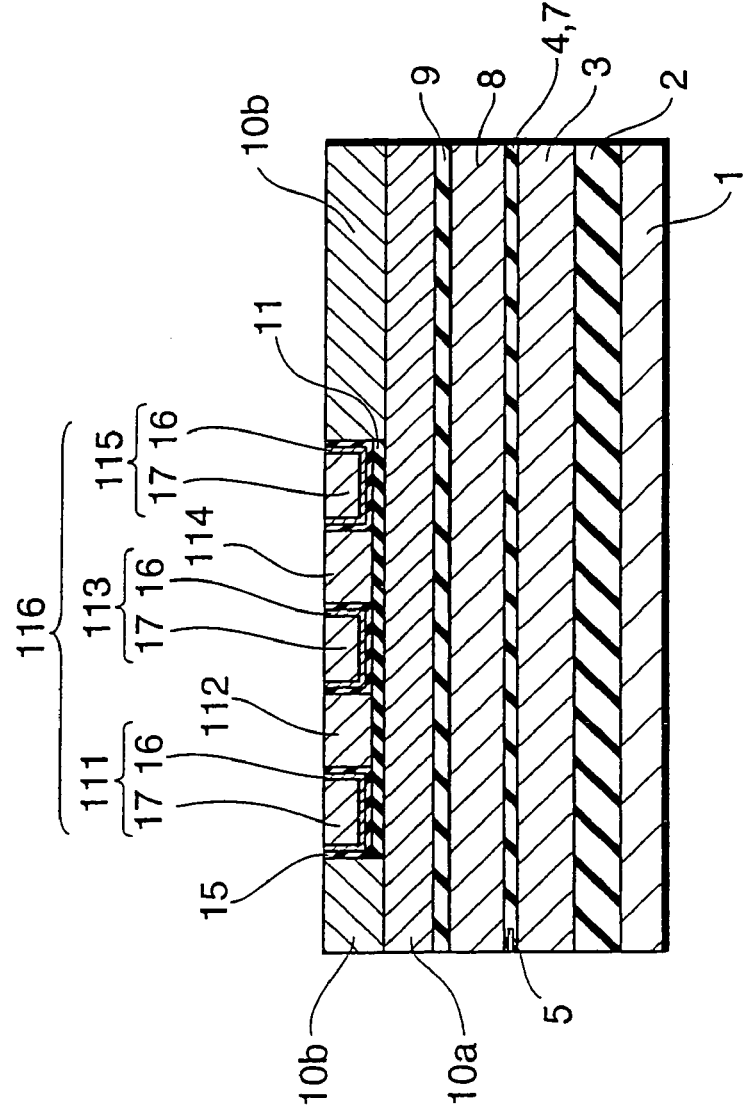

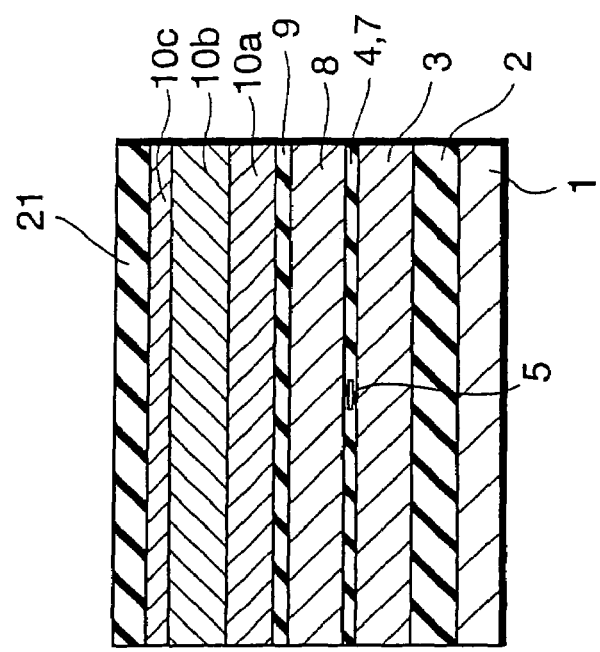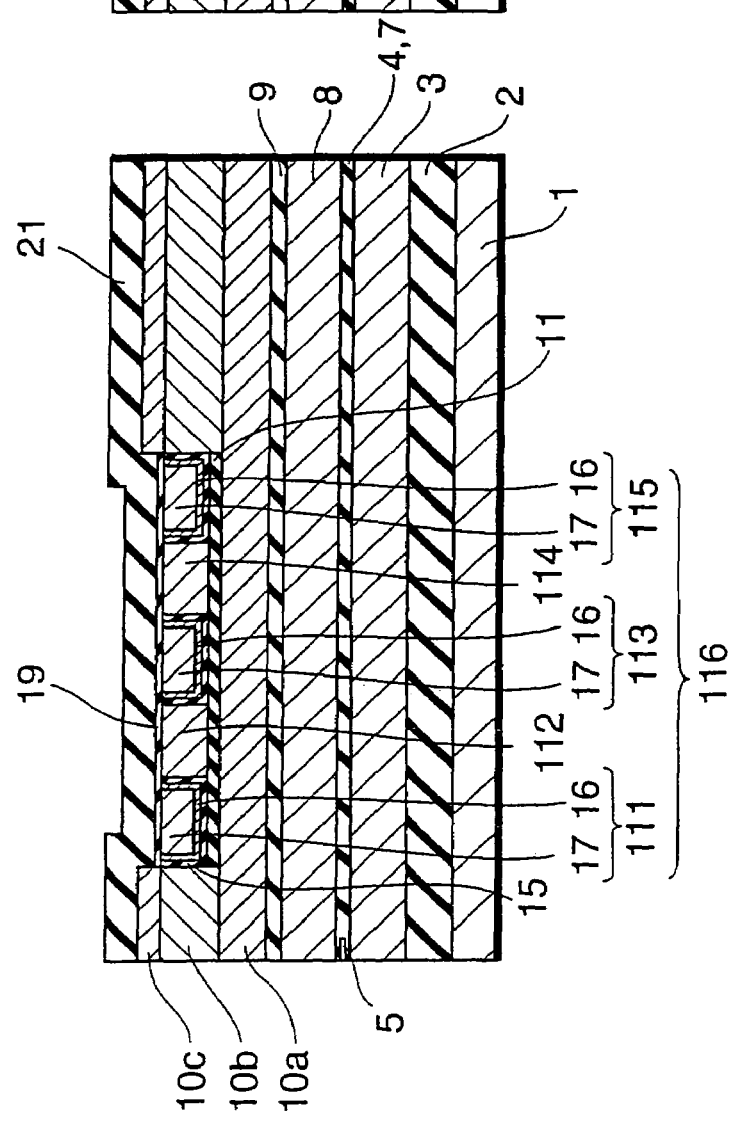

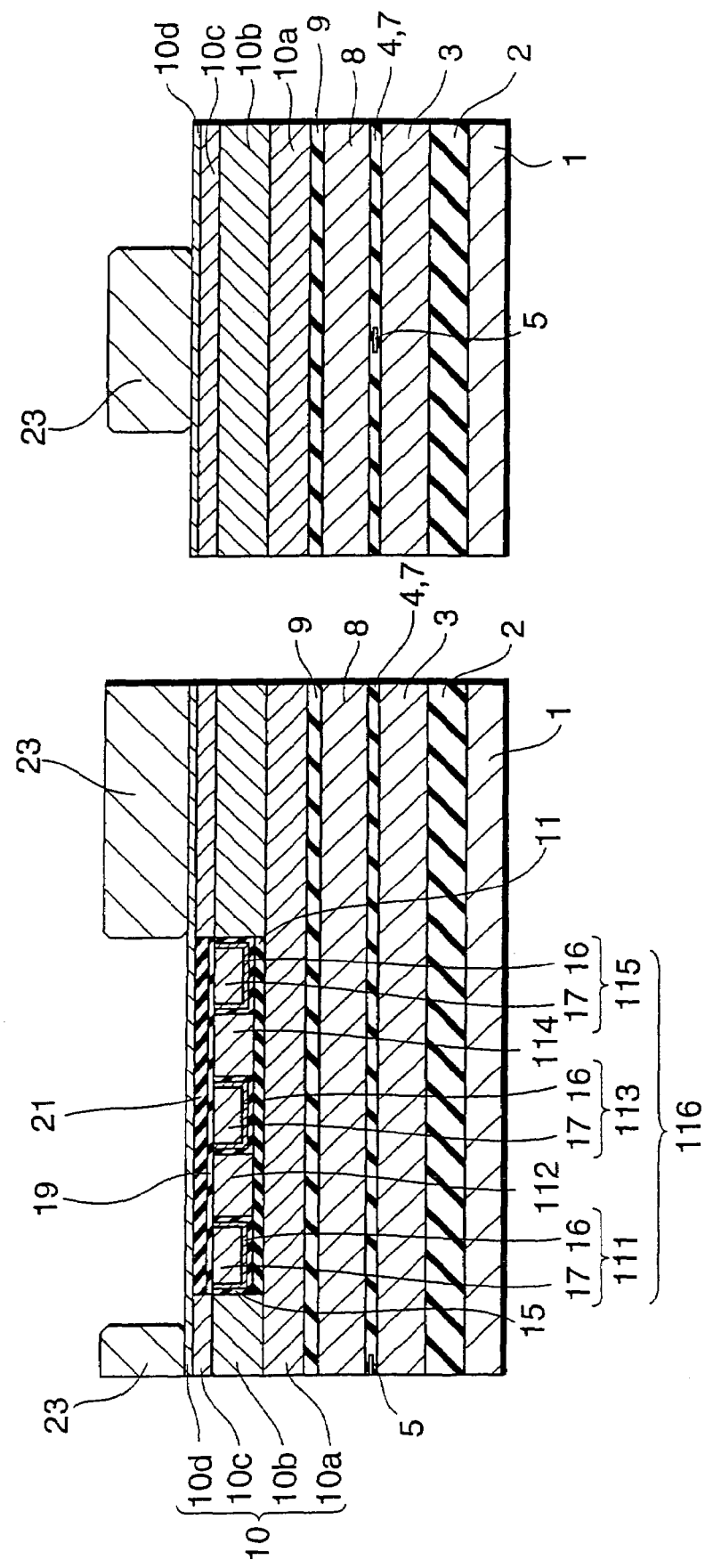

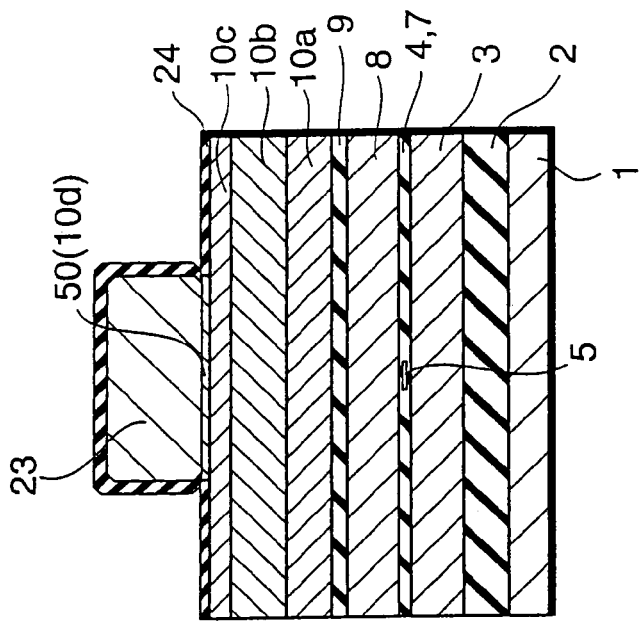
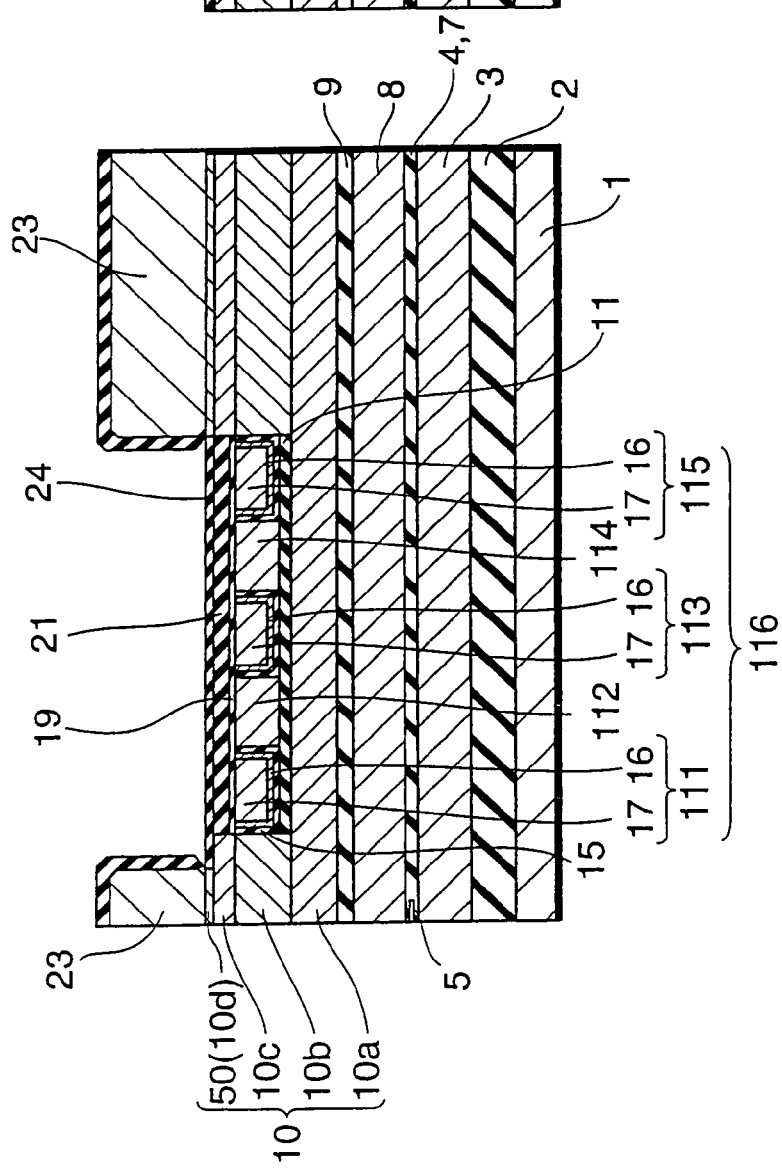

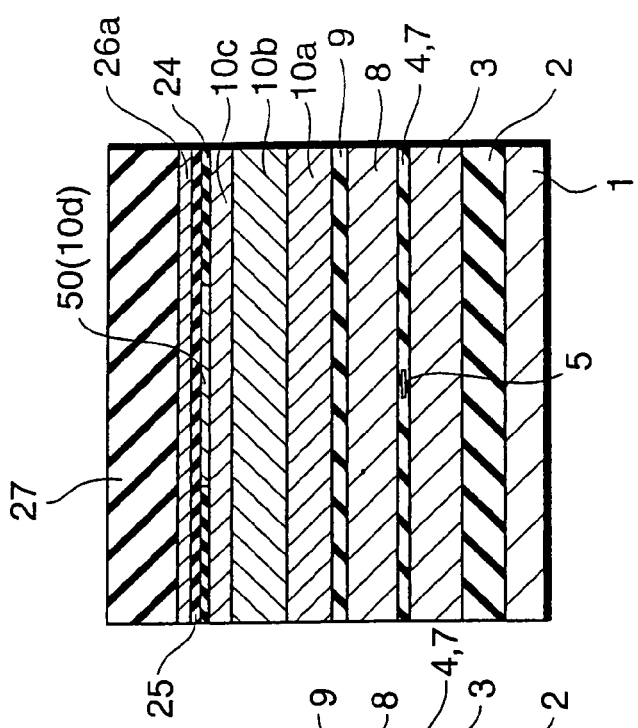
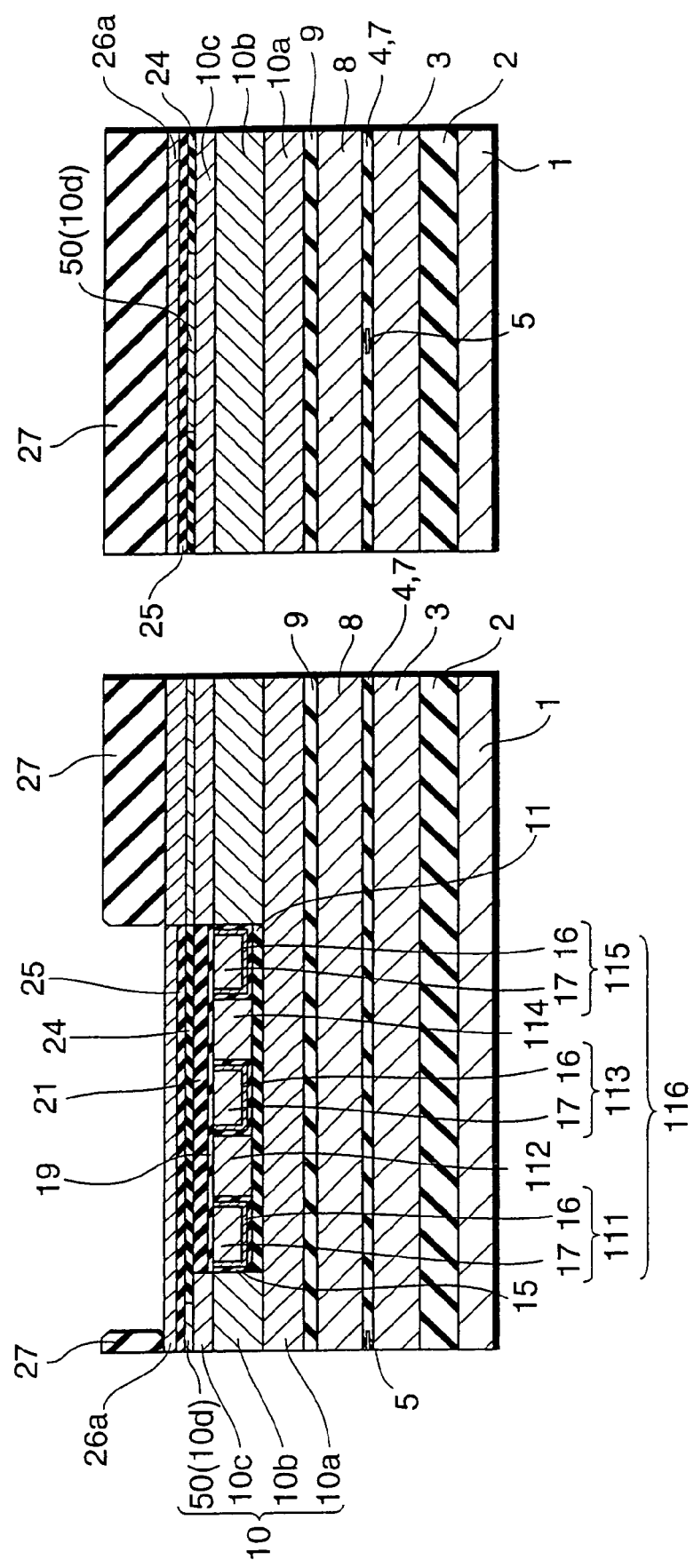

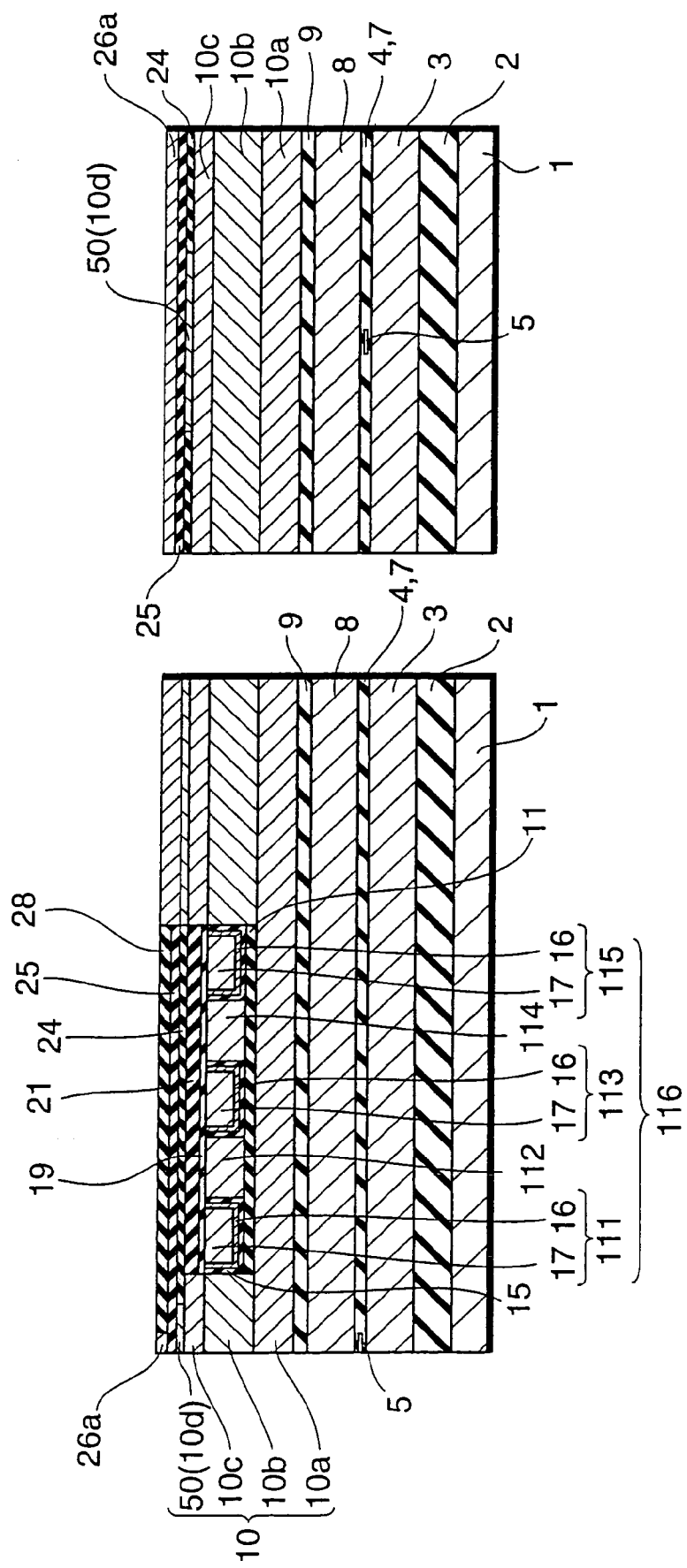

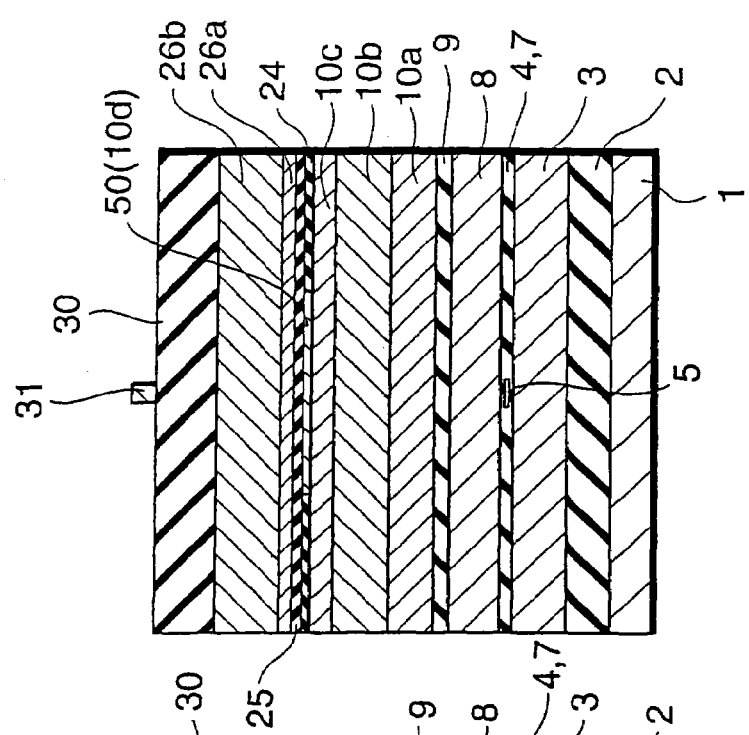
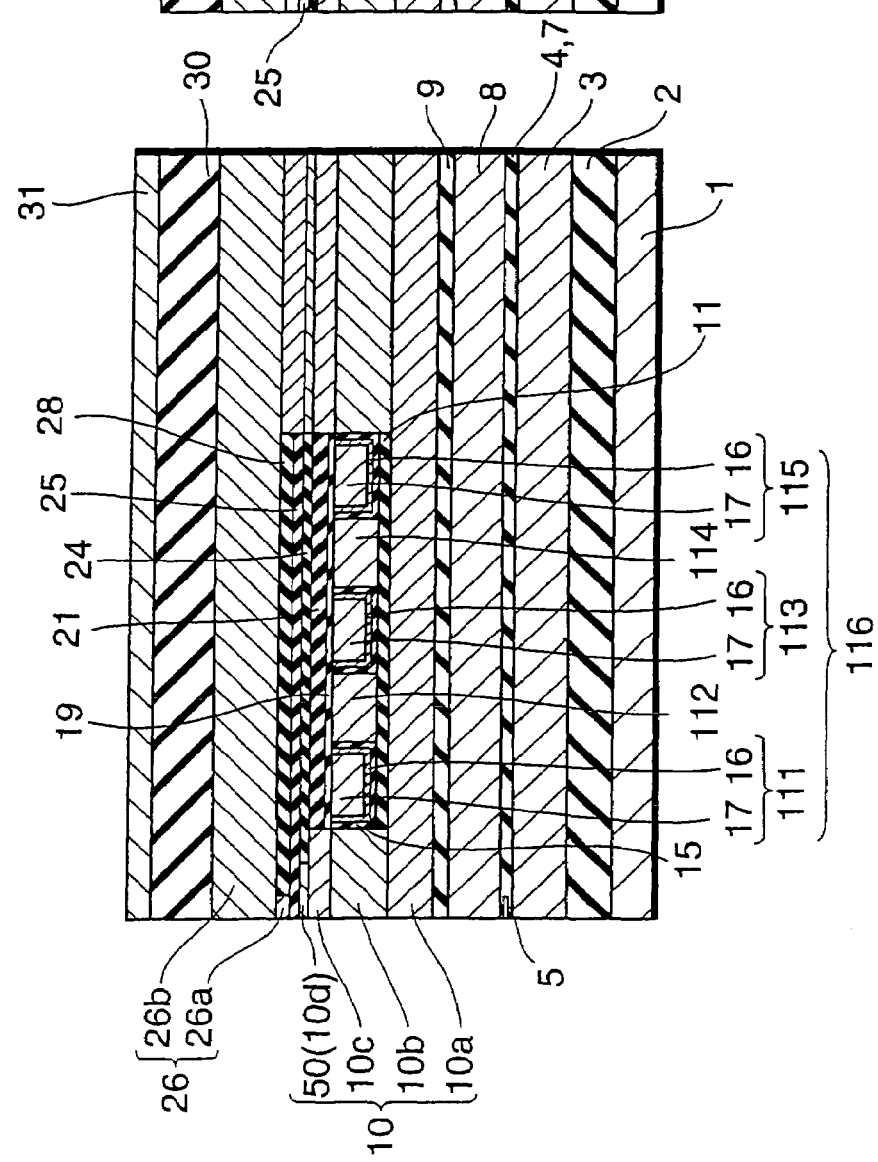

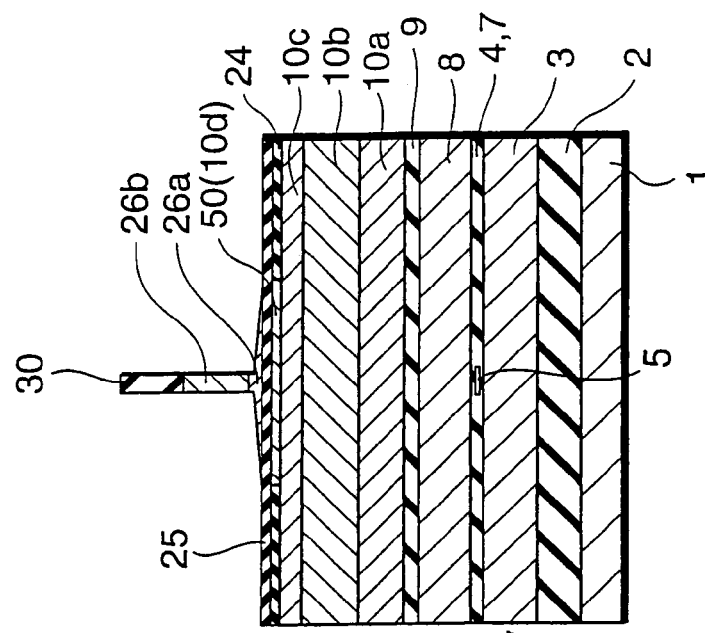
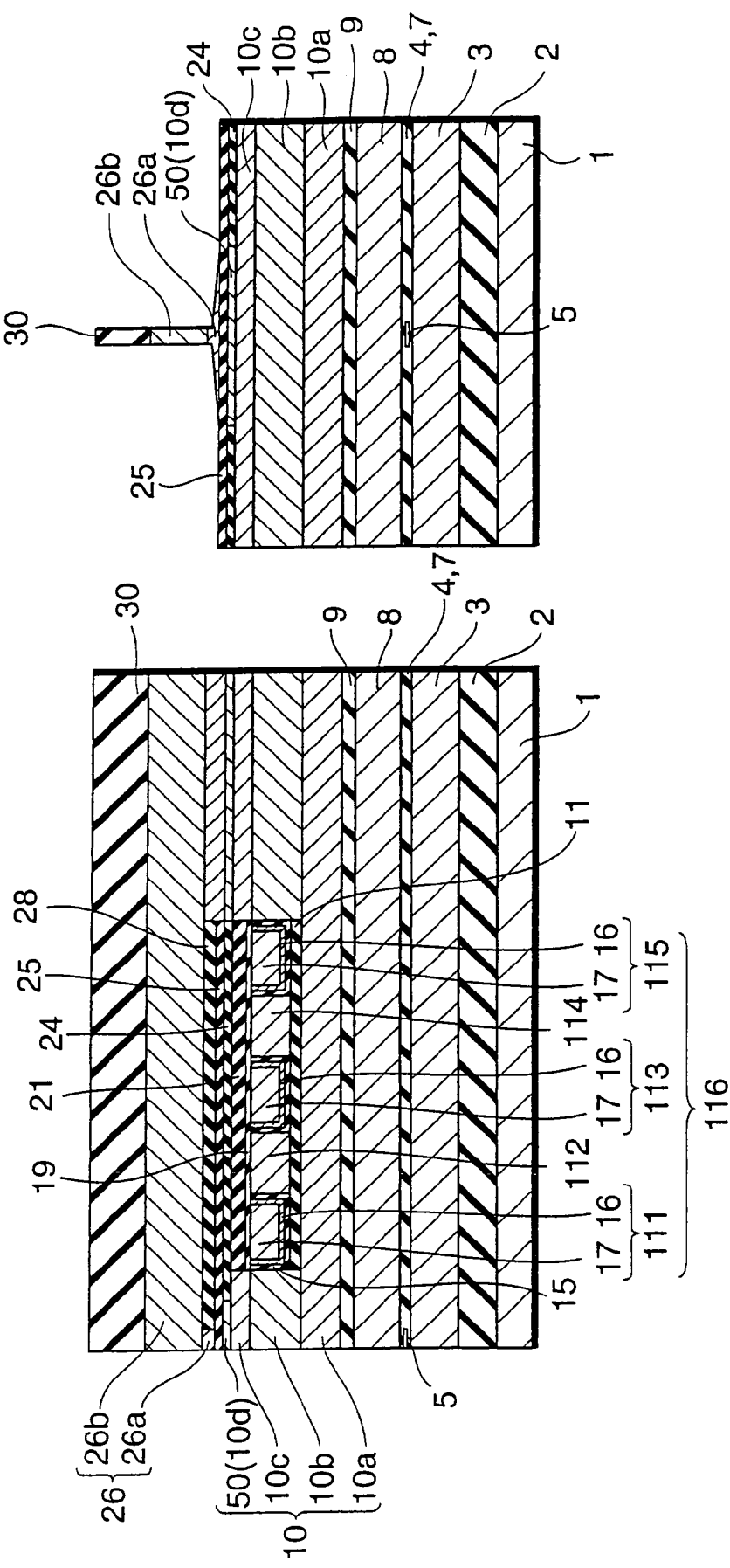
Fig. 13A
Fig. 13B

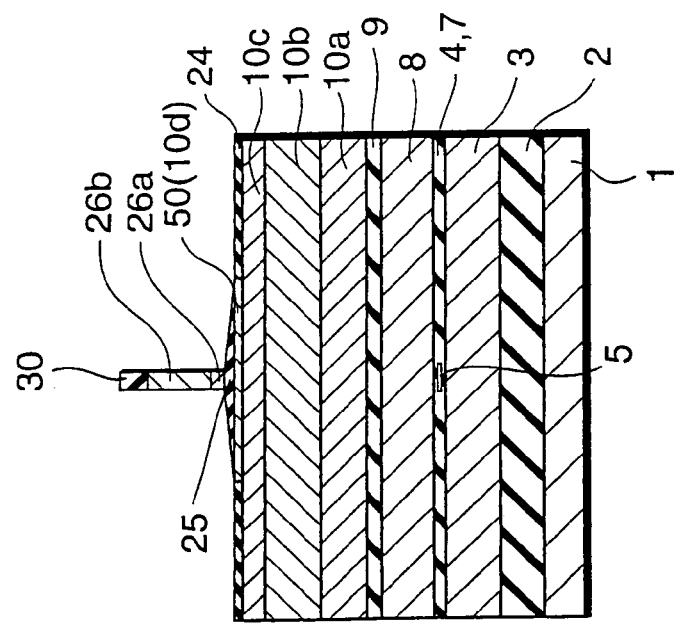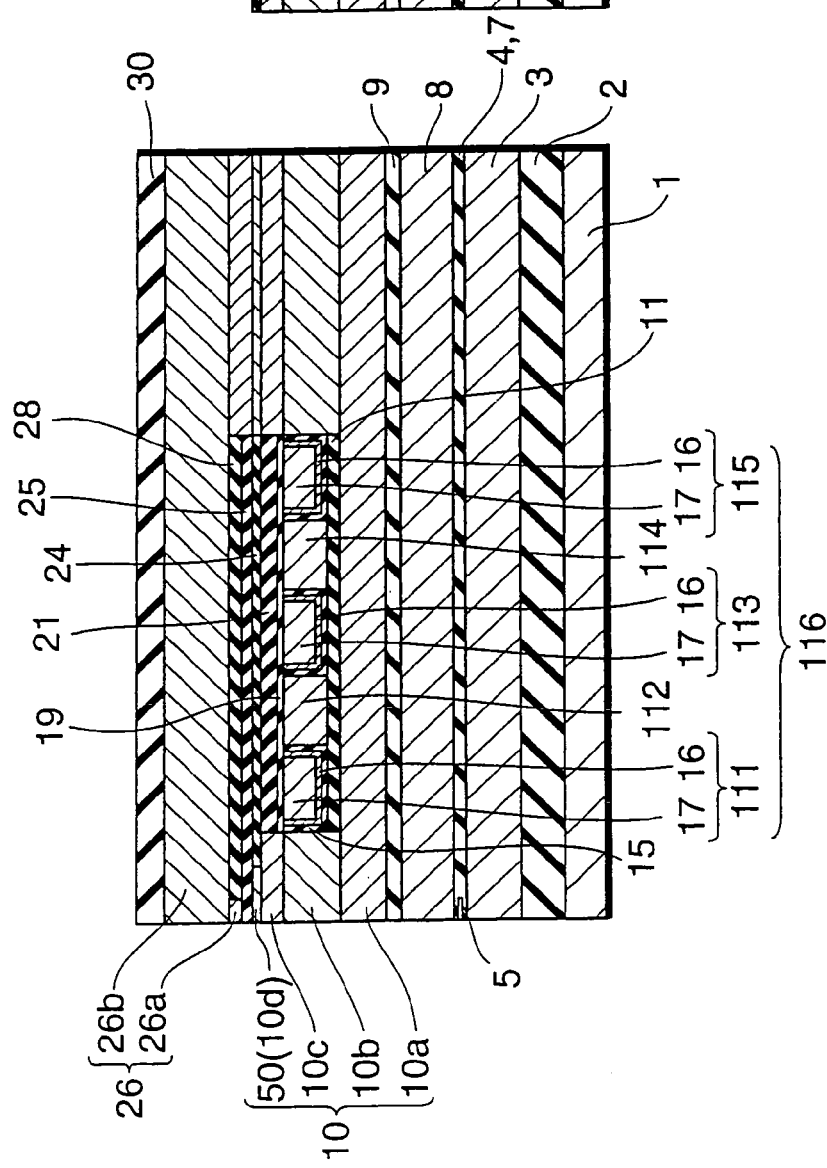

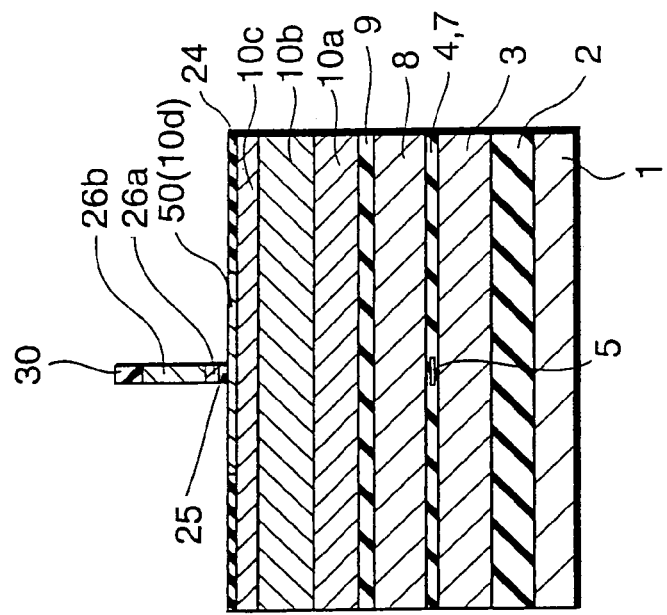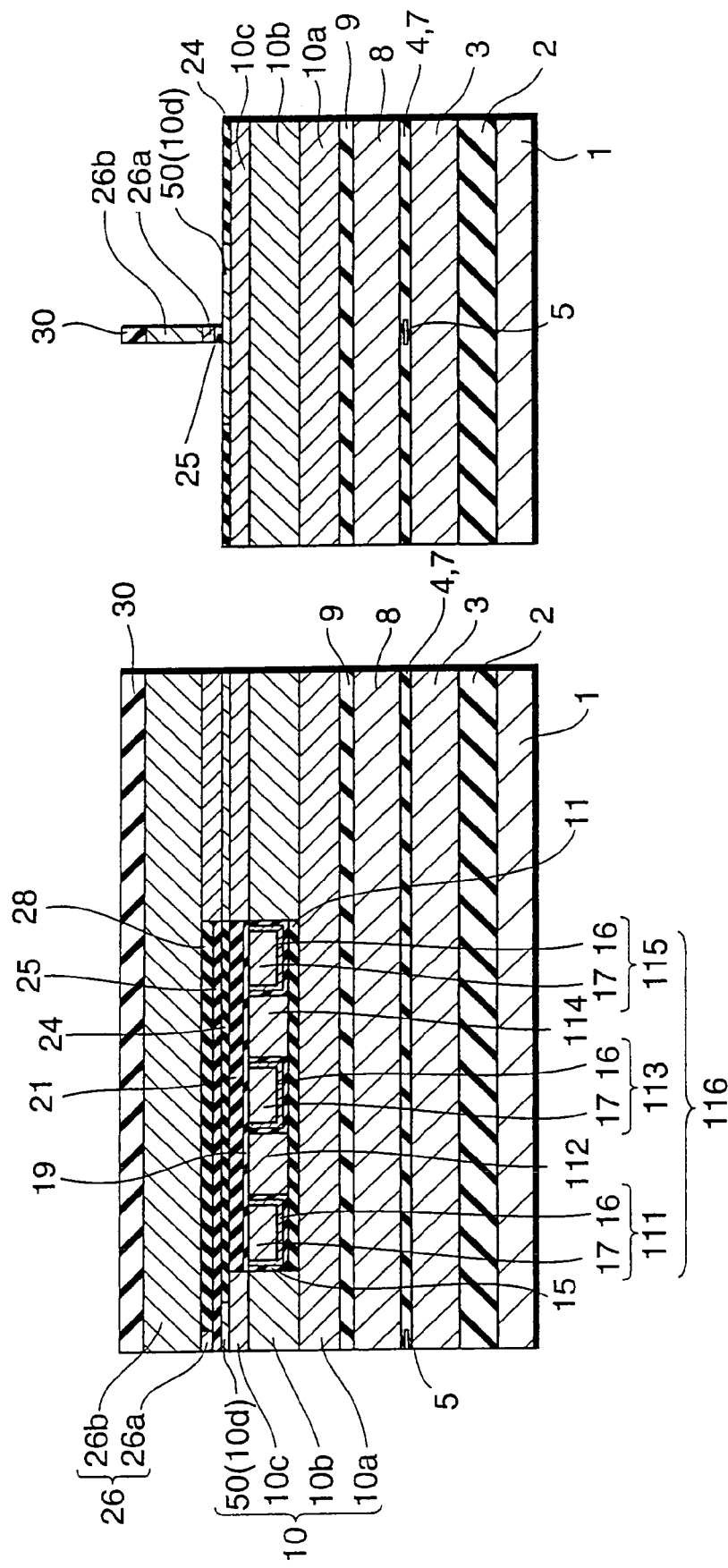

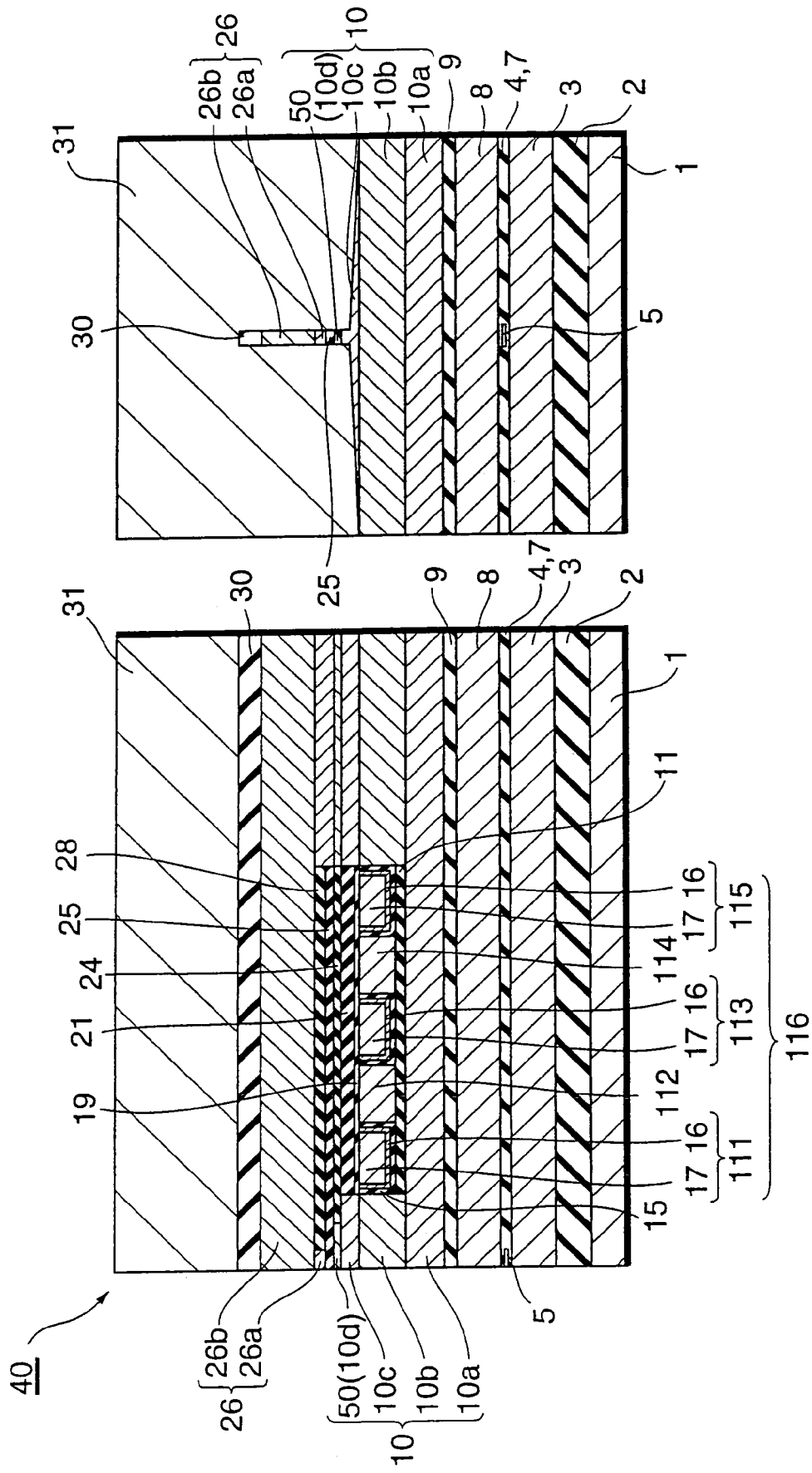

METHOD OF MANUFACTURING A THIN-FILM MAGNETIC HEAD

BACKGROUND OF THE INVENTION

1. Field of the Invention

The present invention relates to a method of manufacturing a thin-film magnetic head.

2. Related Background Art

When manufacturing a thin-film magnetic head, its upper magnetic pole has conventionally been formed into a narrow pattern by ion milling. When ion milling is used, however, a region under the erect upper magnetic pole may attain a raised form whose apex is located near the magnetic pole, thereby causing so-called ATE (Adjusting Track Erase), which unintentionally erases data.

Therefore, a technique of narrowing the upper magnetic pole by reactive ion etching (RIE) instead of ion milling has been proposed. This technique will be explained with reference to FIGS. 17 and 18. FIG. 17 is a view showing a step in a conventional process of manufacturing a thin-film magnetic head, whereas FIG. 18 is a view showing a step subsequent thereto.

First, as shown in FIG. 17, a lower magnetic pole layer 101, a gap layer 102 made of a nonmagnetic material, a first upper magnetic pole layer 103, a second upper magnetic pole layer 104, and an insulating layer 105 made of alumina or the like are formed in this order. Subsequently, a narrow mask 106 is formed on the insulating layer 105 by plating or the like.

Next, as shown in FIG. 18, the insulating layer 105, second upper magnetic pole layer 104, and first upper magnetic pole layer 103 are patterned by RIE in conformity to the form of the mask 106. This drawing shows the state in the middle of etching, in which side walls of the first upper magnetic pole layer 103 are not vertical. The etching will advance further from the depicted state in order to make the side walls of the upper first magnetic pole layer 103 vertical.

SUMMARY OF THE INVENTION

However, the following problem exists in the conventional method mentioned above. Namely, in FIG. 18, regions near the second upper magnetic pole 104 are harder to etch than those far from the magnetic pole layer, since the magnetic pole layer itself obstructs the etching. Hence, the gap layer 102 is etched away in regions farther from the second upper magnetic pole layer 104, whereby the lower magnetic pole layer 101 is exposed and etched in thus exposed regions (in the vicinity of regions indicated by broken lines R). As a result, the etched magnetic material of the lower magnetic pole layer 101 may adhere to the root area of the first upper magnetic pole layer 103 during etching, thereby retarding the progress of vertical etching.

For overcoming the problem mentioned above, it is an object of the present invention to provide a method of manufacturing a thin-film magnetic head which can easily narrow the writing track width.

The method of manufacturing a thin-film magnetic head in accordance with the present invention comprises the steps of forming a first magnetic pole layer; removing both sides in a track width direction of the first magnetic pole layer so as to leave a predetermined residual area in the first magnetic pole layer; forming an insulating layer about the residual area of the first magnetic pole layer; forming a gap layer made of a nonmagnetic material on the residual area of the first magnetic pole layer and the insulating layer; forming on the gap layer a second magnetic pole layer magnetically connected to the first magnetic pole; and patterning the second magnetic pole layer by etching while using a mask.

In this method, even if an area relatively far from the second magnetic pole layer is eliminated from the gap layer when etching the second magnetic pole layer, not the first magnetic pole layer but the insulating layer is mainly exposed from this area. As a consequence, the magnetic material can be prevented from adhering to the vicinity of the second magnetic pole layer during the etching. This can easily narrow the writing track width.

Preferably, the insulating layer formed about the residual area of the first magnetic pole layer is made of $Al_2O_3$. Among insulating materials, $Al_2O_3$ is harder to etch and thus can effectively be restrained from adhering to the root of the second magnetic pole layer and its vicinity.

Preferably, the residual area of the first magnetic pole layer has a width of about 0.5 µm to about 2.0 µm in the track width direction. Forming the insulating layer about the first magnetic pole layer left with such a width can prevent the first magnetic pole layer from being removed and adhering to the root of the second magnetic pole layer and its vicinity at the time of etching the second magnetic pole layer. More preferably, the width of the residual area is about 0.5 µm to about 1.0 µm.

In the present invention, the first magnetic pole layer may be constructed by laminating a plurality of magnetic layers, at least the topmost layer in the plurality of magnetic layers being formed with the residual area, the insulating layer being formed on both sides in the track width direction of the residual area. When the first magnetic pole layer is constituted by a plurality of magnetic layers as such, the effects mentioned above can be exhibited if the topmost layer is formed with the residual area.

BRIEF DESCRIPTION OF THE DRAWINGS

FIGS. 1A and 1B are sectional views showing a step in a process of manufacturing a thin-film magnetic head;

FIGS. 2A and 2B are sectional views showing a step subsequent to that of FIGS. 1A and 1B;

FIGS. 3A and 3B are sectional views showing a step subsequent to that of FIGS. 2A and 2B;

FIGS. 4A and 4B are sectional views showing a step subsequent to that of FIGS. 3A and 3B;

FIGS. 5A and 5B are sectional views showing a step subsequent to that of FIGS. 4A and 4B;

FIGS. 6A and 6B are sectional views showing a step subsequent to that of FIGS. 5A and 5B;

FIGS. 7A and 7B are sectional views showing a step subsequent to that of FIGS. 6A and 6B;

FIGS. 8A and 8B are sectional views showing a step subsequent to that of FIGS. 7A and 7B;

FIGS. 9A and 9B are sectional views showing a step subsequent to that of FIGS. 8A and 8B;

FIGS. 10A and 10B are sectional views showing a step subsequent to that of FIGS. 9A and 9B;

FIGS. 11A and 11B are sectional views showing a step subsequent to that of FIGS. 10A and 10B;

FIGS. 13A and 13B are sectional views showing a step subsequent to that of FIGS. 11A and 11B;

FIGS. 14A and 14B are sectional views showing a step subsequent to that of FIGS. 13A and 13B;

FIGS. 15A and 15B are sectional views showing a step subsequent to that of FIGS. 14A and 14B;

FIGS. 16A and 16B are sectional views showing a step subsequent to that of FIGS. 15A and 15B;

DESCRIPTION OF THE PREFERRED EMBODIMENTS

Figure 12:
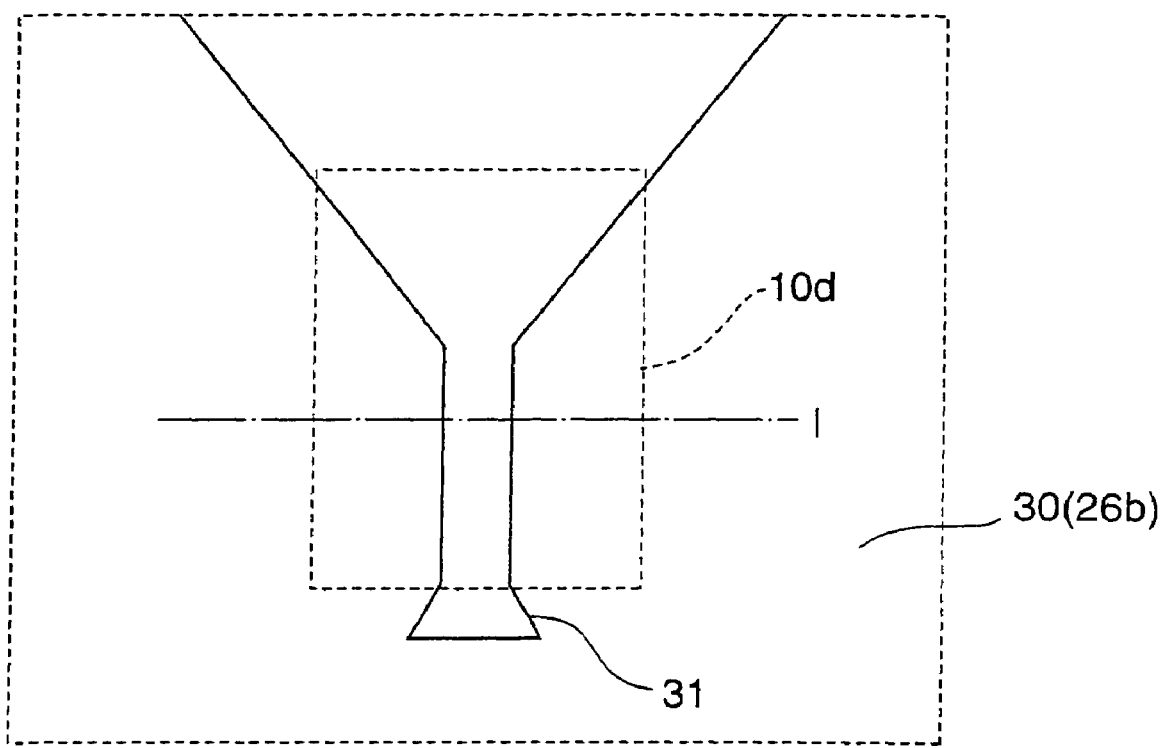
FIG. 12 is a plan view of the laminate shown in FIG. 11A.
Figure 17:
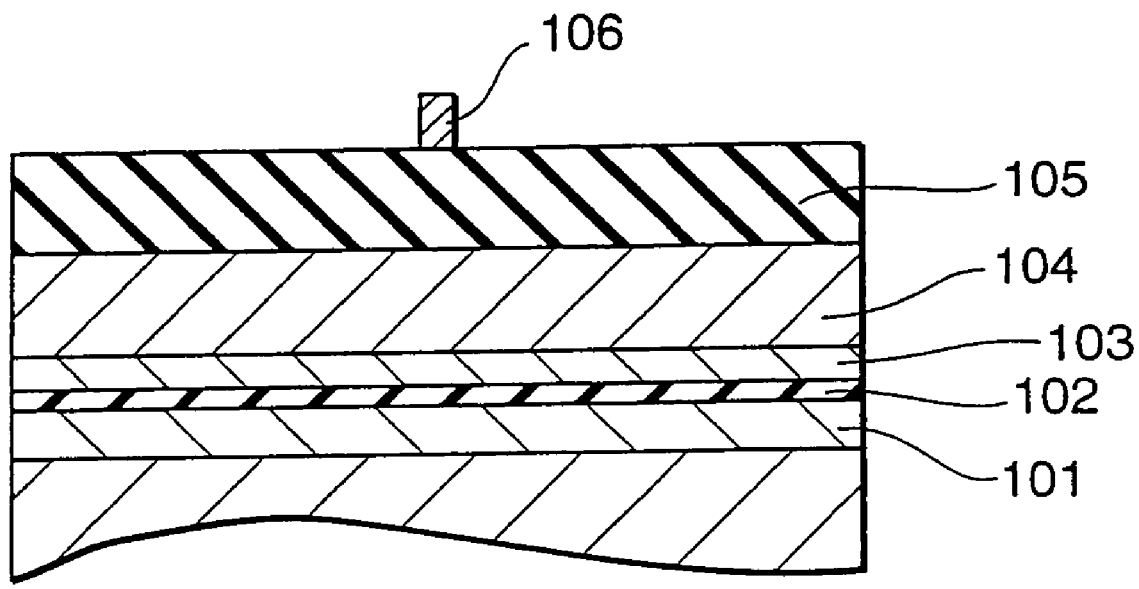
FIG. 17 is a view showing a step of a conventional manufacturing method.
Figure 18:
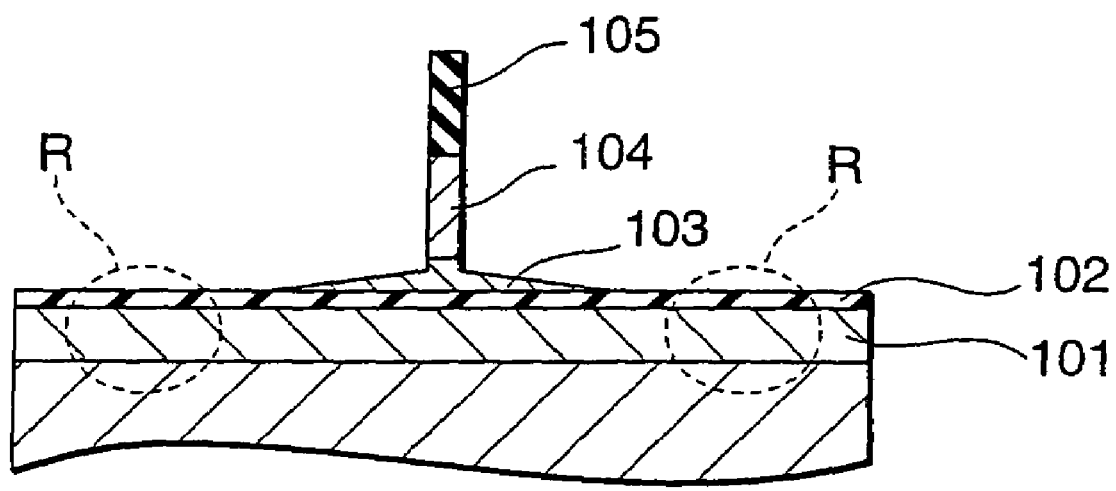
FIG. 18 is a conventional view showing a step subsequent to that of FIG. 17.

In the following, preferred embodiments of the method of manufacturing a thin-film magnetic head in accordance with the present invention will be explained in detail with reference to the accompanying drawings. Constituents identical to each other will be referred to with numerals identical to each other without repeating their overlapping explanations. Among the drawings of manufacturing steps, those with suffix "A" are sectional views taken in a direction orthogonal to a surface to become an air bearing surface, whereas those with suffix "B" are sectional views seen from the direction of the air bearing surface.

First, as shown in FIGS. 1A and 1B, an insulating layer 2 made of alumina ($Al_2O_3$), for example, is deposited by a thickness of about 2 to 5 μm on a substrate 1 made of AlTiC ($Al_2O_3.TiC$), for example. Subsequently, on the insulating layer 2, a lower shield layer 3 for a reproducing head made of a magnetic material such as permalloy is deposited by a thickness of about 2 μm to 3 μm. For example, while using a photoresist film as a mask, the lower shield layer 3 is selectively formed by plating on the insulating layer 2. Then, though not depicted, the whole laminate is formed with an insulating layer made of alumina, for example, by a thickness of about 3 to 4 μm, for example, and thus formed insulating film is polished by chemical mechanical polishing (hereinafter referred to as "CMP"), for example, until the lower shield layer 3 is exposed, so as to flatten the surface.

Next, on the lower shield layer 3, a lower shield gap film 4 as an insulating film is formed by a thickness of about 20 nm to about 40 nm, for example. Subsequently, on the lower shield gap film 4, an MR device 5 is formed by a thickness of several tens of nanometers. The MR device 5 is formed by selectively etching an MR film formed by sputtering, for example. The MR device 5 is disposed near a position where the air bearing surface is formed. In FIG. 1A, the surface of the laminate on the left side becomes the air bearing surface. The MR device 5 has a laminate structure in practice, but is depicted as a single layer. The MR device 5 may be an AMR device, a GMR device, a TMR device, or the like. Subsequently, though not depicted, a pair of electrode layers electrically in contact with the MR device 5 are formed by a thickness of several tens of nanometers on the lower shield gap film 4. Further, on the lower shield gap film 4 and MR device 5, an upper shield gap film 7 as an insulating film is formed by a thickness of about 20 to 40 nm, for example, so that the MR device 5 is buried in the lower shield gap film 4 and upper shield gap film 7 (no boundary between the lower shield gap film 4 and upper shield gap film 7 being shown for convenience of illustration). Examples of insulating materials used for the lower shield gap film 4 and upper shield gap film 7 include alumina, aluminum nitride, and diamond-like carbon (DLC). The lower shield gap film 4 and upper shield gap film 7 may be formed by sputtering or chemical vapor deposition (hereinafter referred to as "CVD").

Next, on the upper shield gap film 7, an upper shield layer 8 for a reproducing head made of a magnetic material is selectively formed by a thickness of about 1.0 to 1.5 μm.

Subsequently, the whole upper face of the laminate obtained by the foregoing steps is formed with an insulating layer 9 made of alumina, for example, by a thickness of 0.3 μm, for example. The layers from the lower shield layer 3 to the upper shield layer 8 constitute a reproducing head part. Then, on the insulating layer 9, a first lower magnetic pole part 10a to become a part of the lower magnetic pole layer 10 (first magnetic pole layer) is formed by a thickness of 0.6 μm, for example.

In this case, the first lower magnetic pole part 10a is formed by sputtering while using FeAlN, FeN, FeCo, CoFeN, FeZrN, or the like, which is a highly saturated magnetic flux density material, as a material. The first lower magnetic pole part 10a may be formed by plating while using NiFe (Ni: 80 wt %, Fe: 20 wt %), NiFe (Ni: 45 wt %, Fe: 55 wt %) which is a highly saturated magnetic flux density material, or the like as a material. Assumed here is an example in which the first lower magnetic pole part 10a is formed by sputtering using CoFeN having a saturated magnetic flux density of 2.4 T.

Next, an insulating film 11 made of alumina, for example, is formed on the first lower magnetic pole part 10a by a thickness of 0.2 μm, for example. Subsequently, the insulating film 11 is selectively etched, so as to form an opening at a position to be formed with a second lower magnetic pole part 10b (see FIG. 2A).

Then, though not depicted, an electrode film made of a conductive material is formed by a thickness of about 50 nm to about 80 nm so as to cover the first lower magnetic pole part 10a and insulating film 11, for example, by sputtering. This electrode film functions as an electrode and seed layer in a plating step which will be explained later.

Next, using the electrode film, frame electroplating is carried out as shown in FIGS. 2A and 2B, so as to form a plating layer made of Cu (copper), for example. This plating layer and an undepicted electrode film thereunder form first conductor parts 112, 114. Each of the first conductor parts 112, 114 has a thickness of 3.0 μm to 4.0 μm, for example. Then, after removing the frame, the electrode film is eliminated by ion beam etching, for example, except for the part located under the first conductor parts 112, 114.

Subsequently, frame electroplating is carried out, so as to form a second lower magnetic pole part 10b made of a magnetic material by a thickness of 3.0 μm to 4.0 μm, for example, on the first lower magnetic pole part 10a. As a material for the second lower magnetic pole part 10b, a highly saturated magnetic flux density material is used, for example. For instance, CoNiFe having a saturated magnetic flux density of 2.1 T and $FeCo_x$ having a saturated magnetic flux density of 2.3 T can be used.

Next, as shown in FIGS. 3A and 3B, a protective photoresist 13 for the first conductor parts 112, 113 is disposed at positions where the second conductor parts 111, 113, 115 are to be provided. The protective photoresist 13 is formed so as to fill at least the space between the second lower magnetic pole part 10b on the air bearing surface side and the inner conductor part 112, the space between the inner conductor parts 112 and 114, and the space between the inner conductor part 114 and the second lower magnetic pole part 10b on the rear side. Further, an insulating layer 14 made of alumina is formed by a thickness of 4 μm to 6 μm, for example, so as to cover the whole upper face of thus formed laminate. Subsequently, the insulating layer 14 is polished by CMP, for example, until the protective photoresist 13 is exposed.

Then, after removing the photoresist 13, a separation insulating film 15 made of alumina, for example, for separating the inner conductor parts from each other, is formed so as to cover the whole upper face of the laminate as shown in FIGS. 4A and 4B by CVD, for example. This forms a plurality of inner grooves, each covered with the separation insulating film 15, between the second lower magnetic pole part 10b on the air bearing surface side and the inner conductor part 112, between the inner conductor parts 112 and 114, and between the inner conductor part 114 and the second lower magnetic pole part 10b on the rear side. The thickness of the separation insulating film 15 is preferably 0.2 μm or less, within the range of 0.08 to 0.15 μm in particular.

Next, in the following procedure, the second conductor parts 111, 113, 115 are formed in the inner grooves covered with the separation insulating film 15.

First, an electrode film 16 made of Cu is formed by a thickness of 0.05 μm to 0.7 μm, for example, so as to cover the whole upper face of the laminate. The electrode film 16 is used as a seed electrode in a plating step which will be carried out later, and can be formed by performing at least one of sputtering and CVD. Subsequently, by plating, a conductive layer 17 made of Cu, for example, is formed by a thickness of 4 μm to 5 μm, for example, on the electrode film 16.

Next, the conductive layer 17 is polished by CMP, for example, until the second lower magnetic pole part 10b and first conductor parts 112, 114 are exposed as shown in FIGS. 5A and 5B. As a consequence, the parts of conductive layer 17 and electrode film 16 remaining in the inner grooves form the second conductor parts 111, 113, 115. Thus obtained second conductor parts 111, 113, 115 and the first conductor parts 112, 114 constitute a thin-film coil 116 used for magnetic recording. The thin-film coil 116 is formed like a vortex with its center extending vertically.

A subsequent step will be explained with reference to FIGS. 6A and 6B. First, an insulating film 19 made of alumina, for example, is formed by a thickness of 0.2 μm, for example, so as to cover the whole upper face of the laminate. Subsequently, etching is carried out so as to leave the insulating film 19 on the thin-film coil 116. Then, a third lower magnetic pole 10c is formed by a thickness of 0.5 μm, for example, by frame plating, for example, on the second lower magnetic pole part 10b. The third lower magnetic pole part 10c can be formed by a highly saturated magnetic flux density material, e.g., CoNiFe having a saturated magnetic flux density of 2.1 T and FeCo$_x$ having a saturated magnetic flux density of 2.3 T. Thereafter, an insulating film 21 made of alumina, for example, is laminated so as to cover the whole upper face of the laminate.

Next, as shown in FIGS. 7A and 7B, the third lower magnetic pole part 10c is flattened by CMP such that its thickness becomes 0.3 to 0.5 μm, and then a fourth lower magnetic pole part 10d is formed by a thickness of about 0.3 μm to about 0.5 μm by sputtering, for example. The fourth lower magnetic pole part 10d can be formed by CoFeN having a saturated magnetic flux density of 2.4 T, for example. Thereafter, a mask layer 23 is formed by a photoresist on the fourth lower magnetic pole part 10d. As can be seen from FIG. 7B, the mask layer 23 does not cover the fourth lower magnetic pole part 10d as a whole in the track width direction in the vicinity of the air bearing surface. Preferably, the mask layer 23 is substantially formed like T with a depressed bottom part in order to facilitate liftoff in a later step.

Next, as shown in FIGS. 8A and 8B, ion beam etching is carried out at an angle of incidence of 20° to 40° from a horizontal plane, so as to eliminate the region of fourth lower magnetic pole part 10d not covered with the mask layer 23. This etching patterns the fourth lower magnetic pole part 10d so as to leave a predetermined residual area 50. Here, as can be seen from FIG. 8B, both sides in the track width direction (depicted lateral direction) of the residual area 50 are eliminated, so as to form the residual area 50. The residual area 50 is located above the MR device 5.

Thereafter, while in a state leaving the mask 23, an insulating layer 24 made of alumina, for example, is laminated by a thickness of about 0.3 μm to 0.6 μm. This forms the insulating layer 24 about the residual area 50 of the fourth lower magnetic pole part 10d (lower magnetic pole layer), at least on both sides in the track width direction of the residual area 50. Subsequently, though not depicted, the mask layer 23 is eliminated by liftoff together with materials deposited thereon, and then the surface of the laminate is polished by a minute amount by CMP.

Next, as shown in FIGS. 9A and 9B, a recording gap layer 25 made of a nonmagnetic material is formed by a thickness of 0.07 μm to 0.1 μm, for example, on the residual area 50 and insulating layer 24. The recording gap layer 25 can be formed by Ru, NiCu, Ta, W, Cr, Al$_2$O$_3$, or Si$_2$O$_3$, for example. Thereafter, the recording gap layer 25 is formed with an opening for connecting the lower and upper magnetic pole layers to each other. This opening is located above the center of the vortex thin-film coil 116.

Subsequently, the whole upper face of the laminate is formed with a first upper magnetic pole part 26a by a thickness of about 0.1 μm to about 0.5 μm by sputtering, for example. The first upper magnetic pole part 26a can be formed by CoFeN having a saturated magnetic pole density of 2.4 T, for example. Thereafter, a mask layer 27 having a predetermined pattern is formed by a photoresist on the first upper magnetic pole part 26a.

Next, as shown in FIGS. 10A and 10B, the area not covered with the mask layer 27 is eliminated from the first upper magnetic pole part 26a by ion beam etching. Thereafter, while in a state leaving the mask layer 27, an insulating layer 28 made of alumina, for example, is laminated by a thickness of about 0.3 μm to about 0.6 μm. Further, though not depicted, the mask layer 27 is removed by liftoff together with materials deposited thereon, and then the surface of the laminate is polished by a minute amount by CMP.

Next, as shown in FIGS. 11A and 11B, the whole upper face of the laminate is formed with a second upper magnetic pole part 26b by a thickness of 0.8 μm to 1.5 μm, for example, by sputtering, for example. The second upper magnetic pole part 26b can be formed by CoFeN having a saturated magnetic pole density of 2.4 T, for example. The first upper magnetic pole part 26a and second upper magnetic pole part 26b are magnetically connected to the first lower magnetic pole part 10a to fourth magnetic pole part 10d through the opening formed in the recording gap layer 25. The first lower magnetic pole part 10a to fourth magnetic pole part 10d constitute a lower magnetic pole layer 10 (first magnetic pole layer), whereas the first upper magnetic pole part 26a and second upper magnetic pole part 26b constitute an upper magnetic pole layer 26 (second magnetic pole layer; see FIG. 16A).

Subsequently, on the second upper magnetic pole part 26b, an insulating layer 30 made of alumina or the like is formed by a thickness of 1.0 μm to 2.0 μm, for example, by sputtering, for example. Further, on the insulating film 30, a plating layer 31 having a desirable pattern is selectively formed by a thickness of 0.3 μm to 1.0 μm, for example. Namely, the plating layer 31 as a mask is formed on the upper magnetic pole layer 26. The plating layer 31 can be formed by CoFe, CoNiFe, or NiFe, for example.

FIG. 12 is a plan view showing the state formed with the plating layer 31. The lateral direction in the drawing is the track width direction. The dash-single-dot line 1 indicates a location which finally becomes an air bearing surface by MR height adjustment. As can be seen from this drawing, in the vicinity of the region to become the air bearing surface, the width of the plating layer 31 in the track width direction is smaller than that of the fourth lower magnetic pole part 10d.

Next, using the plating layer 31 as a mask, reactive ion etching is carried out at a temperature of 50° C. to 300° C., so as to pattern the insulating layer 30, second upper magnetic pole part 26b, and first upper magnetic pole part 26a as shown in FIGS. 13A and 13B. Here, as the etching gas, a mixed gas of $Cl_2$ and $BCl_3$ at a ratio of 2:1 to 5:1 is used. $Cl_2$ or $BCl_3$ may be used alone. The property of selectively etching the second upper magnetic pole part 26b can be improved when $O_2$ gas, $N_2$ gas, or $CO_2$ gas is further introduced. The RF bias at the time of etching is 30 W to 300 W, for example. As can be seen from FIG. 13B, the erected second upper magnetic pole part 26b and first upper magnetic pole part 26a hinder their root and its vicinity from being etched, thus leaving unetched parts.

With reference to FIGS. 14A and 14B, a subsequent step will be explained. The etching is further continued, so that side walls of the first upper magnetic pole part 26a become substantially vertical. Here, an area relatively far from the second upper magnetic pole part 26b in the recording gap layer 25 is also etched. From thus etched area, not the fourth lower magnetic pole part 10d but the insulating layer 24 is mainly exposed. As mentioned above, the insulating layer 24 is buried about the residual area 50 of the fourth lower magnetic pole part 10d. This can prevent the magnetic material from adhering to the root of the first upper magnetic pole part 26a and its vicinity during the etching and obstructing the progress of etching. As a consequence, the writing track width can easily be narrowed.

Preferably, the residual area 50 has a width of about 0.5 μm to about 2.0 μm in the track width direction. When the insulating layer 24 is formed about the magnetic material having such a width, the magnetic material can effectively be prevented from adhering to the root of the first upper magnetic pole part 26a and its vicinity during the etching of the first upper magnetic pole part 26a. More preferably, the width of the residual area 50 is about 0.5 μm to about 1.0 μm.

The following effect is obtained when the insulating layer 24 formed about the residual area 50 is made of $Al_2O_3$. Namely, $Al_2O_3$ is hard to etch among insulating materials, and thus can effectively be restrained from adhering to the root of the first upper magnetic pole part 26a and its vicinity.

Next, as shown in FIGS. 15A and 15B, the recording gap layer 25 is patterned in conformity to the form of the first upper magnetic pole part 26a by RIE using a mixed gas of $Cl_2$ and $BCl_3$. Preferably, the etching is carried out at a temperature of about 100° C. to about 250° C. or room temperature.

Next, as shown in FIGS. 16A and 16B, ion beam etching is carried out at an angle of incidence of 40° to 65° from a horizontal plane, so as to trim the fourth lower magnetic pole part 10d in conformity to the width of the first magnetic pole part 26a. Thereafter, the whole upper face of the laminate is formed with an overcoat layer 31 made of alumina, for example, by a thickness of 20 to 40 μm, for example. Subsequently, a plurality of electrode pads, which are not depicted, are formed on the overcoat layer 31, whereby a thin-film magnetic head 40 in accordance with this embodiment is obtained. Each electrode pad is electrically connected to the MR device 5 and thin-film coil 116.

Since a plurality of thin-film magnetic heads 40 are formed on a single substrate 1 in this stage, the substrate 1 is initially cut into a plurality of bars each including the thin-film magnetic heads 40 arranged in a row. Subsequently, each bar is cut into blocks including the respective thin-film magnetic heads 40. Then, a slider rail is formed by ion milling or the like, so as to yield a head slider. This head slider is mounted to a gimbal, which is then connected to a suspension arm, whereby a head gimbal assembly is completed. Thus produced head gimbal assembly is assembled such that the head slider is movable over a hard disk and can record and reproduce magnetic signals, whereby a hard disk drive is obtained.

Though the invention achieved by the inventor is specifically explained with reference to the embodiment in the foregoing, the present invention is not limited to the above-mentioned embodiment. For example, the upper magnetic pole layer (second magnetic pole layer) may be formed at once without dividing it into the first upper magnetic pole part 26a and second upper magnetic pole part 26b.

The lower magnetic pole layer can be modified in various manners without being restricted to the four-layer structure. When employing a laminate structure, it will be sufficient if an insulating layer is provided about (at least on both sides in the track width direction of) the residual area formed in the topmost layer.

The recording scheme of the thin-film magnetic head may be either in-plane recording or perpendicular recording. Instead of a configuration (so-called insertion type) in which the second conductor parts 111, 113, 115 are buried in the inner grooves beside the first conductor parts 112, 114, the thin-film coil may have a configuration in which the inner grooves are filled with an insulating layer. The thin-film coil may be disposed helically (in a so-called helical type configuration) about a region vertically extending from the air bearing surface in the upper magnetic pole layer.

As explained in the foregoing, the method of manufacturing a thin-film magnetic head in accordance with the present invention can easily narrow the writing track width.

What is claimed is:

1. A method of manufacturing a thin-film magnetic head, the method comprising the steps of:

forming a first magnetic pole layer;

removing both sides in a track width direction of the first magnetic pole layer so as to leave a predetermined residual area in the first magnetic pole layer;

forming an insulating layer about the residual area of the first magnetic pole layer;

forming a gap layer made of a nonmagnetic material on the residual area of the first magnetic pole layer and the insulating layer;

forming, on the gap layer, a second magnetic pole layer magnetically connected to the first magnetic pole layer; and patterning the second magnetic pole layer and the gap layer by etching, while protecting the first magnetic pole layer from the etching with a mask formed by a remaining portion of the gap layer and the insulating layer formed about the residual area of the first magnetic pole layer, so that a width of the second magnetic pole layer in the track width direction is smaller than that of the residual area.

2. A method of manufacturing a thin-film magnetic head according to claim 1, wherein the insulating layer is formed from $Al_2O_3$.

3. A method of manufacturing a thin-film magnetic head according to claim 1, wherein the residual area of the first magnetic pole layer has a width of about 0.5 µm to about 2.0 µm in the track width direction.

4. A method of manufacturing a thin-film magnetic head according to claim 1, wherein the first magnetic pole layer is constructed by laminating a plurality of magnetic layers; wherein at least a topmost layer in the plurality of magnetic layers is formed with the residual area; and wherein the insulating layer is formed on both sides in the track width direction of the residual area.

* * * * *